April 21, 1970     K. HOFFMANN     3,507,732

PROTECTION OF STRAIN GAGE TRANSDUCERS

Filed June 27, 1967

INVENTOR
KARL HOFFMANN
BY
Thomson E. Meose
ATTORNEYS

United States Patent Office 3,507,732
Patented Apr. 21, 1970

3,507,732
PROTECTION OF STRAIN GAGE TRANSDUCERS
Karl Hoffmann, Darmstadt, Germany, assignor to Hottinger Baldwin Messtechnik G.m.b.H., Darmstadt, Germany, a corporation of Germany
Filed June 27, 1967, Ser. No. 649,168
Claims priority, application Germany, July 5, 1966, H 59,868
Int. Cl. B29c 6/02
U.S. Cl. 156—242        2 Claims

ABSTRACT OF THE DISCLOSURE

A generally conventional electrical strain gage unit, which is installed by bonding to a test surface, is lastingly shielded and protected against contaminations, particularly against adverse influences of moisture, by a hollow closed cap which is separately secured to the test surface in a covering spaced relation to the gage unit and contains a viscous moisture-impervious filler protectively covering the gage unit while not impeding its responses to conditions under measurement.

BACKGROUND OF THE INVENTION

It has been known heretofore that a strain gage might be somewhat protected against influences of moisture by way of applied coatings of moisture-repellent substances such as grease, wax, paraffin, and the like; however, such exposed coatings are effective only for limited times and further involve the disadvantage that the substances used tend to be unstable under mechanical stresses to which they are subjected. Often, the coatings must be applied in liquid form, and it becomes necessary to resort to undesirable heating of the coating substance as well as the strain gage itself in order to achieve proper adhesion. Obviously, such a procedure is very difficult, if not impossible, to follow when vertical or overhead surfaces are involved.

Another known proposal relies upon a rubber cap to enclose the strain gage; although such caps afford good mechanical protection, there must be absolute all-around sealing if there is to be adequate protection against the influences of moisture. The latter consideration requires that the cap be cemented moisture-tight over the strain gage, involving extensive work and great care to avoid moisture entry even by capillary action. These problems also are present in connection with sealing of the associated strain gage lead wires. Moisture can also enter by diffusion through the cap material and the cementing compound, and thereby eventually reach the strain gage. Since the methods mentioned thus far do not in themselves fully protect the strain gage against moisture, it is sometimes a collateral practice, when using protective means such as rubber caps, to include a drying agent, such as silica-gel, within the cap to absorb the moisture which penetrates. However, this technique is but a temporary aid, because the drying agent saturates in time and therefore leaves the strain gage susceptible upon further influx of moisture.

A further known practice involves a strain gage which is first coated and then covered with a cap such as the aforementioned cap. This entails all the aforesaid difficulties associated with the application of a protective cap, and yet does not insure permanent protection, inasmuch as ambient moisture will still exert its detrimental influence upon the strain gage, although delayed. In addition, there remains the problem of applying the coatings which have to be liquefied and caused to adhere well by heating.

SUMMARY

The present invention is aimed at creating an improved strain gage device which combines the advantage of a mechanical guard with permanent protection against moisture and with ease of installation. In this connection, preferred constructions involve the use of a relatively flexible hollow sealing cap over the strain gage, and the pocket thus created is filled with a viscous non-rigid moisture-repellent compound which is retained within the cap for lasting protection of the gage without detracting from its responses to measured conditions.

Additional characteristics are listed with the other claims of this invention. Following are particulars of the invention which are explained with the aid of illustrations showing preferred embodiments and practices.

DESCRIPTION OF THE PREFERRED EMBODIMENTS

Figure 1:
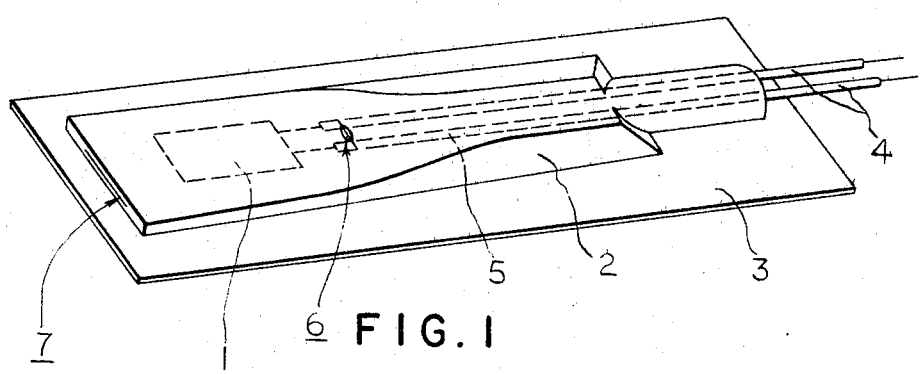
FIGURE 1 shows a perspective view of an improved protected strain gage device.

In FIGURE 1, a conventional form of strain gage 1, such as a wire, foil or semiconductor unit, is designated by dashed linework and will be understood to be attached in the usual manner, as by cementing, to a surface of the test object 3 which is to undergo evaluation. A hollow cap 2 is also affixed to the same test object, as by separate cementing around its lower edges which surround the gage, in covering spaced relation to the gage. The cap both provides mechanical protection for the strain gage and serves as a retainer for a moisture-impervious and repellent filler. Depending upon the conditions expected to be encountered in use, the cap may be either relatively thick and/or rigid or relatively thin and/or flexible to conform to curved or uneven surfaces. In one preferred form, it comprises a substantially transparent plastic substance, permitting its interior to be viewed, particularly the filler material. Colored cap materials are advantageous for identification of the uses to which the various cap constructions are best adapted. In the case of plastic caps, vacuum molding or the like may conveniently be employed in their manufacture. It will of course be understood that the hollow cup-shaped cap does not directly contact the strain gage, and that the latter is instead spaced from the cap surfaces by the void of a cap cavity or pocket extending inwardly of the cap from the side defined by the peripheral edges which are cemented to the test object. Preferably, the cap 2 is provided with a cable feed-through position, 5, having elongated openings into which the strain gage lead wires 4 are preferably fitted closely.

Once the strain gage 1 has been affixed to the test object 3 and the edges of hollow cap 2 have been affixed to the same object, with the leads 4 passing through the cap and the pocket or void in the cap enveloping the gage, the cap is then filled with a liquid or paste-like compound which protects against moisture. This cap can be filled via any accessible opening, such as spaces through the cable feedthrough portion 5, or preferably, through a small filler opening 6 provided for that purpose and, obviously, communicating with the pocket within the cap. When the cap material is flexible, opening 6 may be essentially a slit which is self-closing; a syringe aids in injecting the compound into the pocket. Air which is displaced by the filler compound may escape through the filler opening, or may be forced through the additional self-closing slit opening or valve, such as that designated by reference character 7 at one end of the cap.

It is desirable to fill the cap until substantially all air has escaped and the filling compound flows from all spaces which may lead to the pocket. This heightens protection of the strain gage against moisture which may enter by diffusion or capillary action through the cemented seal along edges of the cap, or even by way of any intentionally provided openings in the cap. This provides an essentially permanent moisture protection. Edges of the cap may alternatively be clamped or otherwise affixed to the test object, rather than being cemented to it.

Figure 2:
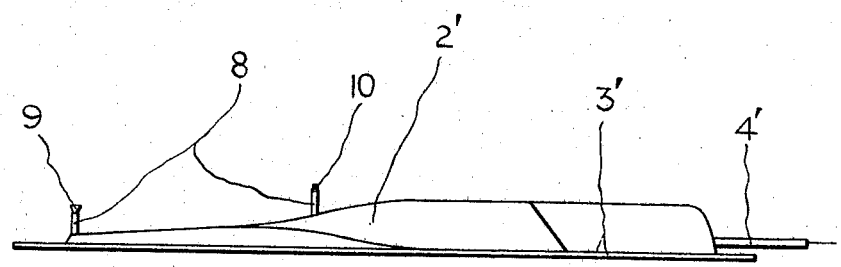
FIGURE 2 shows a side view of a modified construction of the improved protected strain gage device.

In special cases, where external forces upon the cap may tend to cause the filling compound to leak out and thus allow the entry of moisture, the openings which are initially necessary may be sealed later. In this connection, FIGURE 2 shows short tube-like extensions 8 which can either be closed by a plug 9 or be heat-sealed or cemented as designated by character 10. The same can be done with the cable feed-through portion 5, which may be plugged, cemented or heat-sealed. If suitable heat-softenable material is used, the sealing can be achieved using a hot soldering iron, for example. A leaf valve or slot valve, as at 7 in FIGURE 1, also may be sealed. Those portions of the FIGURE 2 arrangement which are like corresponding portions of the FIGURE 1 arrangement are, for convenience, identified by the same reference characters, with distinguishing single-prime accents being added.

Grease, wax, paraffin, high-temperature grease, silicone grease, and other materials having the desired characteristics can be used as fillers. The rigidity of the compounds should be such as not to influence the strain gage mechanically. In general these filling substances are paste-like substantially permanently viscous flowable substances and are impervious to and repellent of moisture; by way of example, vaseline is especially suitable. Liquid or paste-like plastics which will polymerize or chemically set are also usable, provided they do not unduly interfere mechanically with the gage operation. The electrical properties of the filling compound should of course be consistent with requirements of proper gage operation and should not detract from insulation of the strain gage. Possible chemical interactions between the cap material and filler are obviously avoided in the selections of these materials.

Although the improved arrangements as herein disclosed afford a high degree of advantageous mechanical and moisture protection for precision strain gages, their installation is simple and uncomplicated, and no unusual degree of care and skill is required to achieve the effects of a substantially perfect hermetic seal. The filling compound inside the cap does not allow the entry of environmental moisture, and, because the cap is attached before the filling operation, even liquid compounds can be introduced into the semi-sealed cap, no matter in what position it may be mounted on a test surface. Undesirable heating can be avoided entirely, or limited to localized sealing sites which are well isolated from the sensitive gage. The cap also usefully serves to hold the gage cables or lead wires, thereby isolating the delicate gage itself from outside forces on these elements. Preferably the cap has a generally flat configuration, consistent with the need for the pocket and for spacing from the gage. More than one gage may be enclosed within a single cap, as in those instances where a plurality of gages are to be disposed at essentially one position in either an adjacent or superposed relation, and other circuit elements, such as known compensators of various types, may be included within the cap also. Exploiting the present teachings, the need for over-all hermetic sealing of complex assemblies may in some cases be obviated with the gages themselves being protected by the filled caps instead.

It should be understood that the embodiments and practices described and portrayed herein have been presented by way of disclosure rather than limitation, and that various modifications, substitutions and combinations may be effected without departure from the spirit and scope of this invention in its broader aspects.

What I claim as new and desire to secure by Letters Patent of the United States is:

1. The method of protecting an electrical strain gage of the type which is affixed to a surface of a test object, comprising the steps of attaching to the surface of the test object in surrounding relation to the strain gage the edges of a pre-formed cap which are in surrounding relation to a cavity in the cap of sufficient size to accommodate the strain gage therein in spaced relation to surfaces of the cap, and injecting into the cavity through an opening in the cap a moisture-impervious and moisture-repellant substance in substantially liquid form until substantially all gas in the cavity is displaced thereby, said injecting further including venting the gas from the cavity, and wherein injecting the substance into the cavity is continued until the cavity is filled and the substance is forced by pressure through openings in communication with the cavity.

2. The method of protecting an electrical strain gage of the type which is affixed to a surface of a test object, comprising the steps of attaching to the surface of the test object in surrounding relation to the strain gage the edges of a pre-formed cap, which are in surrounding relation to a cavity in the cap of sufficient size to accommodate the strain gage therein in spaced relation to surfaces of the cap, injecting into the cavity through an opening in the cap a moisture-impervious and moisture-repellant substance in substantially liquid form until substantially all gas in the cavity is displaced thereby, said injecting further including venting the gas from the cavity, and closing vent and filler openings after injecting the substance into the cavity.

References Cited

UNITED STATES PATENTS

| 2,462,162 | 2/1949 | Christensen et al. | 29—613 |
| 2,810,870 | 10/1957 | Hunter et al. | 29—588 |
| 3,089,107 | 5/1963 | Dean | 338—2 |

FOREIGN PATENTS

| 273,446 | 5/1951 | Switzerland. |
| 1,784,942 | 3/1959 | Germany. |

OTHER REFERENCES

The Strain Gage Primer, by C. C. Perry and H. R. Lissner. 2nd ed. 1962, McGraw-Hill Book Co., N.Y. pp. 175–182.

The Oil and Gas Journal, Apr. 4, 1960, vol. 58, No. 14, pp. 92–96.

RUEBEN EPSTEIN, Primary Examiner

U.S. Cl. X.R.

29—613; 156—303.1; 264—203, 272